(12) United States Patent
Brittner et al.

(10) Patent No.: US 6,590,735 B1
(45) Date of Patent: Jul. 8, 2003

(54) CONTINUOUSLY ADAPTIVE SEEK DECELERATION PROFILING

(75) Inventors: Rod Brittner, Longmont, CO (US); Robert Murphy, Boulder, CO (US); Margot A. Lapanse, Superior, CO (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/483,775

(22) Filed: Jan. 18, 2000

Related U.S. Application Data

(60) Provisional application No. 60/130,299, filed on Apr. 21, 1999.

(51) Int. Cl.[7] .............................................. G11B 5/596
(52) U.S. Cl. .................................. 360/78.07; 360/78.09
(58) Field of Search .......................... 360/78.06, 78.07, 360/78.09, 78.04, 78.14; 318/561

(56) References Cited

U.S. PATENT DOCUMENTS

| | | | |
|---|---|---|---|
| 4,835,633 A | * 5/1989 | Edel et al. | 360/78.12 |
| 4,899,234 A | 2/1990 | Genheimer | 360/78.06 |
| 4,982,298 A | 1/1991 | Volz et al. | 360/78.06 |
| 5,132,855 A | 7/1992 | Waugh et al. | 360/78.07 |
| 5,305,160 A | 4/1994 | Funches et al. | 360/78.07 |
| 5,402,400 A | * 3/1995 | Hamada et al. | 369/32 |
| 5,793,558 A | 8/1998 | Codilian et al. | 360/78.06 |
| 5,835,302 A | 11/1998 | Funches et al. | 360/78.07 |
| 5,912,782 A | * 6/1999 | Lee et al. | 360/78.09 |
| 6,011,668 A | * 1/2000 | Choi | 360/78.06 |
| 6,088,188 A | * 7/2000 | Serrano et al. | 360/78.06 |
| 6,115,205 A | * 9/2000 | Waugh et al. | 360/78.06 |

* cited by examiner

Primary Examiner—Andrew L. Sniezek
(74) Attorney, Agent, or Firm—Merchant & Gould P.C.

(57) ABSTRACT

A method for adapting a control system governing the swing of an actuator arm to the actual deceleration capacity of an attached servomechanism, comprising: maximally accelerating the actuator arm; measuring the actual acceleration; calculating the ratio between the actual acceleration and nominal acceleration; multiplying an actual distance parameter by the ratio before indexing into a velocity profile to retrieve a target velocity; and multiplying a feedforward signal by the ratio prior to feeding it into a control loop. The apparatus includes a servomechanism that swings the actuator arm; a transducer that produces a signal representing the arm's position; a ROM containing a velocity profile; a microprocessor connected to the transducer and ROM, controlling the velocity of the actuator arm such that it tracks retrieved target velocities by outputting a control signal, and a power amplifier connected to the microprocessor and servomechanism, for receiving the control signal and driving the servomechanism.

12 Claims, 5 Drawing Sheets

CONTINUOUSLY ADAPTIVE SEEK DECELERATION PROFILING

RELATED APPLICATION

This application claims the benefit of the filing date of U.S. Provisional Patent Application Ser. No. 60/130,299 filed Apr. 21, 1999 and entitled "CONTINUOUSLY ADAPTIVE SEEK DECELERATION PROFILING."

FIELD OF THE INVENTION

This application relates to hard disc drives and more particularly to an apparatus and method for adjusting a velocity profile of an actuator arm to the actual acceleration capabilities of the system.

BACKGROUND OF THE INVENTION

The storage medium for a disc drive is a flat, circular disc capable of storing data as localized magnetic fields. The data, that are stored upon the disc, find physical representation through these localized magnetic fields. The data are recorded on a disc in concentric, circular paths known as tracks.

The localized magnetic fields can be detected by a head when the field is brought in close proximity to the head. During operation the disc continually rotates, meaning that for each rotation, a head fixed a given radius from the center of the disc would read the data recorded in a given track. An actuator arm swings the head in an arc across the disc surface to allow the head to read or write data along a different track.

The read/write head is mounted upon the distal end of the actuator arm, and the arm is moved by a servo control system. Accordingly, the track position of the head is controlled by the servo system. When the head needs to access a different track, the actuator arm swings the head to the desired track location. The motion of the head from one track to another includes an acceleration and a deceleration phase, and the period during which head movement occurs is known as the seek time. For drive performance, it is desirable to minimize the seek time.

In a conventional disc drive, the movement of the actuator arm is controlled by a feedback control loop, and may include feedforward control as well. The control process typically works as follows. A ROM (a ROM memory device is a memory device which stores data that either cannot be erased or cannot be erased during normal operation) look-up table possesses a worst case velocity profile that indicates the target velocity of the head, given the head's distance from the desired track. Such a table assumes a worst case rate of deceleration. Typically, the table yields a target velocity for a given distance parameter based upon the relationship $v=[2ax]^{1/2}$, where v represents the target velocity, a represents the worst case acceleration, and x represents the distance that the head must travel, along an arc centered about the arm's pivot point, to reach its desired track position. When movement begins, the arm is accelerated with the maximum torque possible. At intervals, the control system gathers information regarding the actual velocity of the head, and the head's distance from the desired track position. Using the distance measurement, the ROM table is accessed to retrieve a target velocity for the arm and thus the head. Next, the difference between the target velocity and the actual velocity of the head is found. Acceleration continues until the actual velocity of the head meets the target velocity or a predetermined maximum velocity, whichever is lower. When the actual velocity exceeds the target velocity, deceleration commences.

During deceleration, the control system once again periodically gathers information regarding the actual velocity of the head, and the head's distance (again, measured along an arc centered about the arm's pivot) from the desired track position. Using the distance measurement, the ROM table is accessed to retrieve the target velocity of the head. Next, the difference between the target velocity and the actual velocity of the head is found. The servo system is fed with a current that is proportional to the difference between the head's actual and target velocity, and a resulting torque will be applied to the actuator arm, decelerating the arm. Deceleration continues until the head comes to rest at the desired track position.

Importantly, under this conventional scheme deceleration is controlled to follow a worst case deceleration profile, which is calculated based upon a presumed deceleration ability of the system, given worst case mechanical and environmental factors. By using the worst case profile, it is ensured that even in the worst case scenario, a head will not overshoot its desired target during a seek operation. Assuming the system were actually able to decelerate at rates greater than the assumed nominal rate, the system would possess the ability to transport the head a greater distance before decelerating and then decelerate at a greater rate, thereby reducing the seek time.

U.S. Pat. No. 4,899,234 ("the '234 patent") describes one scheme by which a control system can dynamically adapt to the deceleration capacity of the servomechanism it is controlling. The '234 patent teaches a scheme wherein a disc drive is preloaded with a time value representative of the time consumed, under worst case operating conditions, for the drive's head to travel the number of tracks required for the head to reach maximum velocity under best case operating conditions. At the commencement of each seek operation, the actual time required for the head to travel the number of tracks required to reach maximum velocity under best case operating conditions is measured, assuming the seek operation requires the head to traverse at least that many tracks. The worst case time is then divided by the measured time, producing a performance ratio.

During a seek operation, the control system described in the '234 patent functions as described in the conventional case, with the following exceptions: the velocity profile is designed assuming a worst case acceleration capacity instead of a nominal acceleration capacity, and the target velocity returned from the velocity profile is multiplied by the performance ratio. In concert, these alterations allow the control system of the '234 patent to dynamically adapt to the deceleration capacity of the servomechanism it is controlling.

Certain factors influence the efficacy of the control system of the '234 patent. One such factor is the precision with which the drive is capable of measuring time. Because the performance ratio described in the '234 patent is calculated from a measured time interval and the performance ratio is used to scale the velocity profile, it is essential that the system be capable of measuring time precisely. A system with significant quantization error with respect to time will propagate that error, yielding a velocity profile which has been inaccurately scaled. Another factor affecting the efficacy of the control system of the '234 patent is that the system requires a seek operation traversing a certain number of tracks—the number of tracks required for the head to reach maximum velocity under best case operating conditions—before a performance ratio can be calculated and the system adapted to the deceleration capacity of the servomechanism.

SUMMARY OF THE INVENTION

The method and apparatus in accordance with the present invention solves the aforementioned problem and other problems by adapting the nominal velocity profile to the actual deceleration capabilities of the system. The method involves controlling the swing of an actuator arm with feedback and feedforward control systems. The method commences by accelerating the actuator arm with maximum torque, and obtaining the actual acceleration of the actuator arm. A performance ratio is then calculated as the ratio between the actual acceleration and the nominal acceleration of the actuator arm. Acceleration may be obtained by measuring the distance the head travels over a given interval of time. This permits the system to determine acceleration, and therefore the performance ratio, by measuring head displacement, a variable it can determine with precision. Further, acceleration may be measured prior to the head achieving maximum velocity, meaning this method is effective even for relatively small seek lengths. The performance ratio is used to scale the distance axis of the nominal velocity profile by multiplying the distance parameter by the performance ratio before indexing into the velocity profile to retrieve a target velocity. The performance ratio is also used to scale a feedforward deceleration control signal before it is fed forward into the control loop.

This method reduces the seek time of the non-worst case disc drive by allowing the control system to take advantage of the full deceleration capacity of the system. This is characterized by the head being transported a greater distance before the commencement of deceleration, coupled with deceleration occurring at greater rates. However, since the profile is adaptive, it allows the worst case drive to operate according to worst case deceleration assumptions, thereby not overshooting its target during a seek operation.

The apparatus includes a servomechanism, which is used to apply torque to an actuator arm. A transducer is coupled to the servomechanism so that it produces a signal representative of the position of the head. A microprocessor is operably connected to the transducer and to a ROM possessing a velocity profile. The microprocessor calculates the actual velocity of the actuator arm from the position signal, and utilizes the position signal scaled by a performance ratio to access the ROM table for a target velocity. Then, the microprocessor subtracts the actual velocity from the target velocity to produce an error quantity, multiplies the error quantity by a constant to produce an error product, and adds the error product to a ratio-scaled feedforward signal. The microprocessor then converts the aforementioned sum into an analog signal, which a power amplifier receives, and magnifies so as to drive the servomechanism.

These and various other features as well as advantages which characterize the present invention will be apparent from a reading of the following detailed description and a review of the associated drawings.

DETAILED DESCRIPTION

Figure 1:
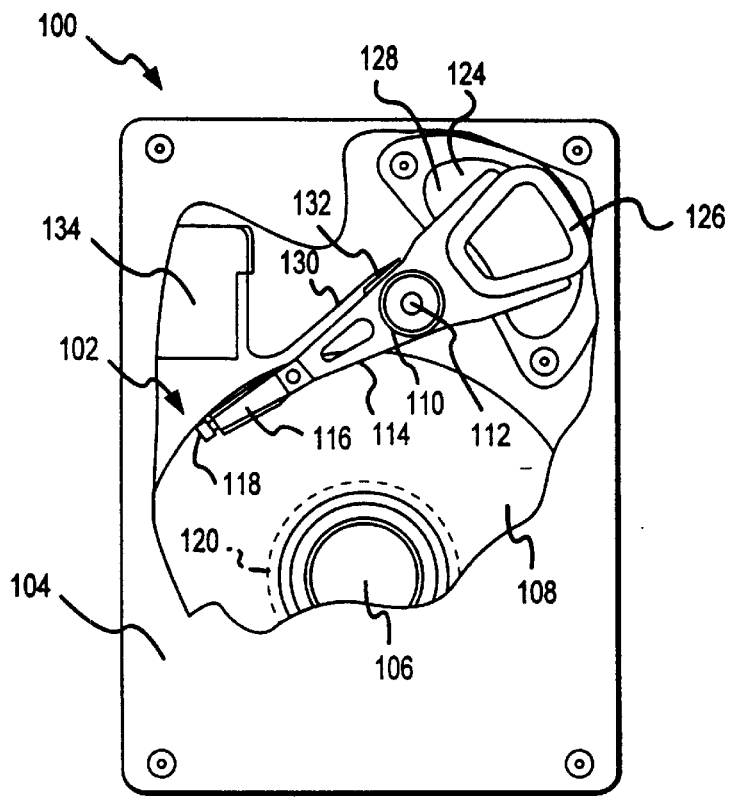
FIG. 1 is a schematic representation of a disc drive in accordance with a preferred embodiment of the invention.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

The spindle motor 116 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
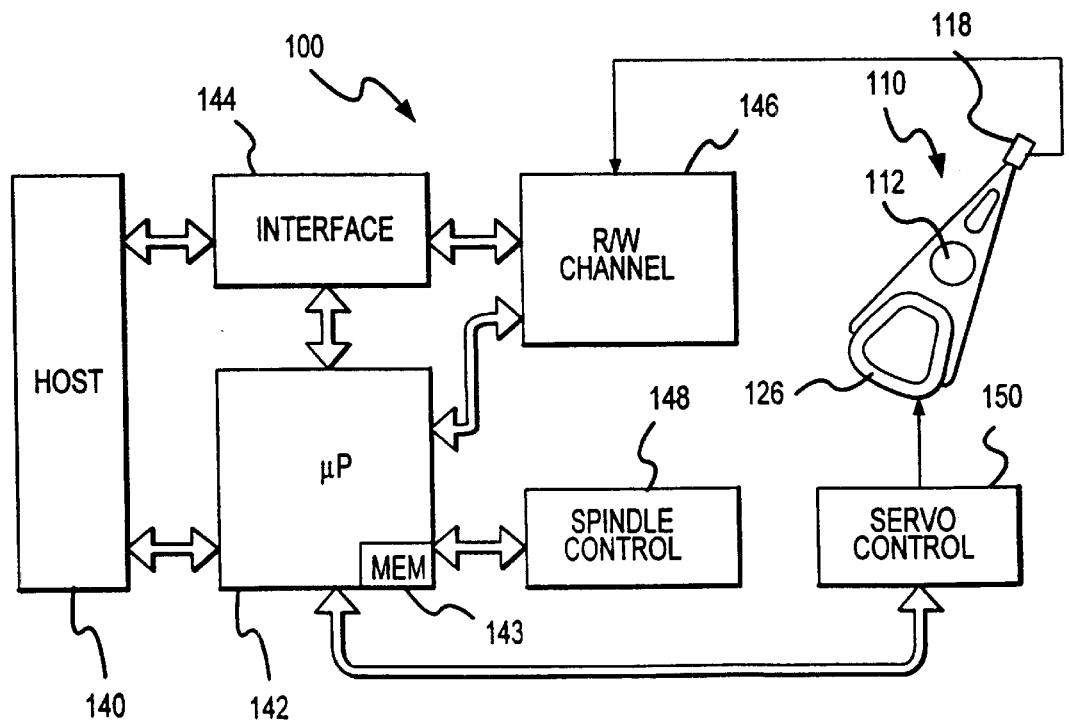
FIG. 2 illustrates a disc drive system connected to a host for the disc drive of FIG. 1.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle control circuit 148, which typically electrically commutates the spindle motor 106 (FIG. 1) through the use of back electromotive force (BEMF) sensing. During a seek operation, the track position of the heads 118 is controlled through the application of current to the coil 126 of the actuator assembly 110. A servo control circuit 150 provides such control. As will be shown in greater detail in FIG. 7, during a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor 126, thereby causing the actuator assembly 110 to be pivoted.

Data is transferred between the host computer 140 and the disc drive 100 by way of a disc drive interface 144, which typically includes a buffer to facilitate high speed data transfer between the host computer 140 and the disc drive 100. Data to be written to the disc drive 100 are thus passed from the host computer to the interface 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and error detection and correction operations and outputs the retrieved data to the interface 144 for subsequent transfer to the host computer 140. Such operations of the disc drive 100 are well known in the art and are discussed, for example, in U.S. Pat. No. 5,276,662 issued Jan. 4, 1994 to Shaver et al.

Figure 3:
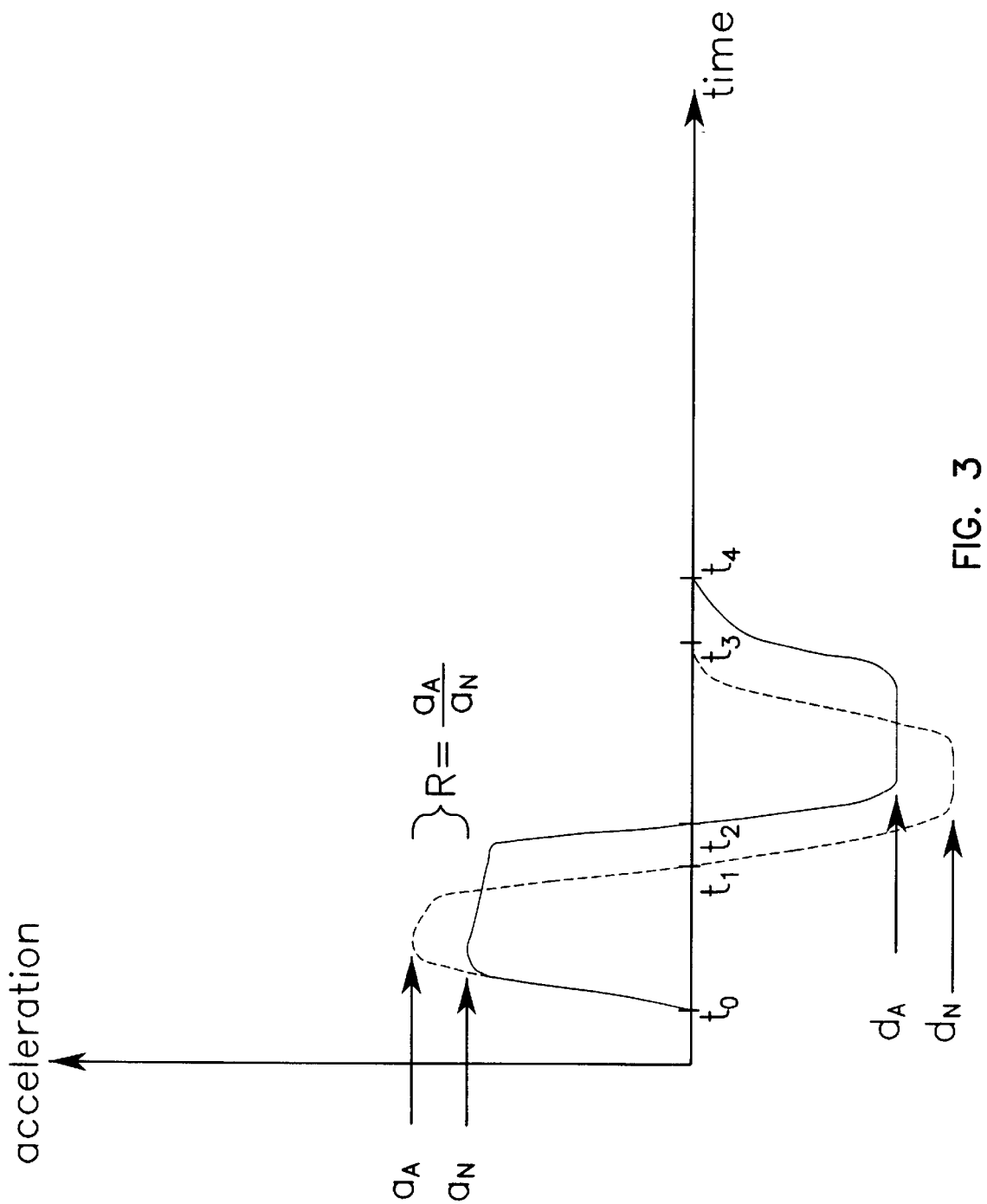
FIG. 3 illustrates an adapted acceleration curve superimposed upon a typical acceleration curve.

FIG. 3 depicts the typical acceleration and deceleration pattern of the actuator arm during a seek operation. During a seek operation, the actuator arm undergoes both a period of acceleration and a period of deceleration. The solid line represents a characteristic acceleration pattern for an actuator arm, and has an acceleration period bounded by times $t_0$ and $t_2$, followed by a deceleration period bounded by times $t_2$ and $t_4$. As can be seen, the acceleration period is shorter than the deceleration period. This is due to the servomechanism becoming saturated during acceleration (due to mounting back EMF coupled with a finite power supply), yet remaining unsaturated during deceleration. Another effect of the back EMF is the negative slope displayed at the peak of the acceleration pattern. The rates of acceleration and deceleration in this example are nominal rates, rates that based upon the specification of the servomechanism ought to be achievable. It is well known, however, that environmental and systemic factors influence the performance of a servomechanism. As a result, it is possible for a particular servomechanism to possess an acceleration and deceleration capacity which is greater or less than the nominal assumption.

The dotted line on FIG. 3 represents an acceleration pattern that has been altered to utilize the full acceleration and deceleration capacity of the servomechanism. As shown, the actual acceleration rate ($a_A$) exceeds the nominal rate ($a_N$), a condition mirrored by the deceleration rates. By making use of this greater acceleration and deceleration capacity, acceleration and deceleration times are reduced, and a corresponding reduction in the overall seek access time is realized.

Another principle demonstrated by FIG. 3 is that because the same set of factors which influence acceleration also influence deceleration, the ratio between actual acceleration and nominal acceleration is equal to that of actual deceleration and nominal deceleration ($d_A/d_N=a_A/a_N$). In adherence with this principle, a performance ratio (R), which is calculated as the ratio between actual acceleration and nominal acceleration ($R=a_A/a_N$), may be used as a proxy for the ratio between actual deceleration and nominal deceleration.

Figure 4:
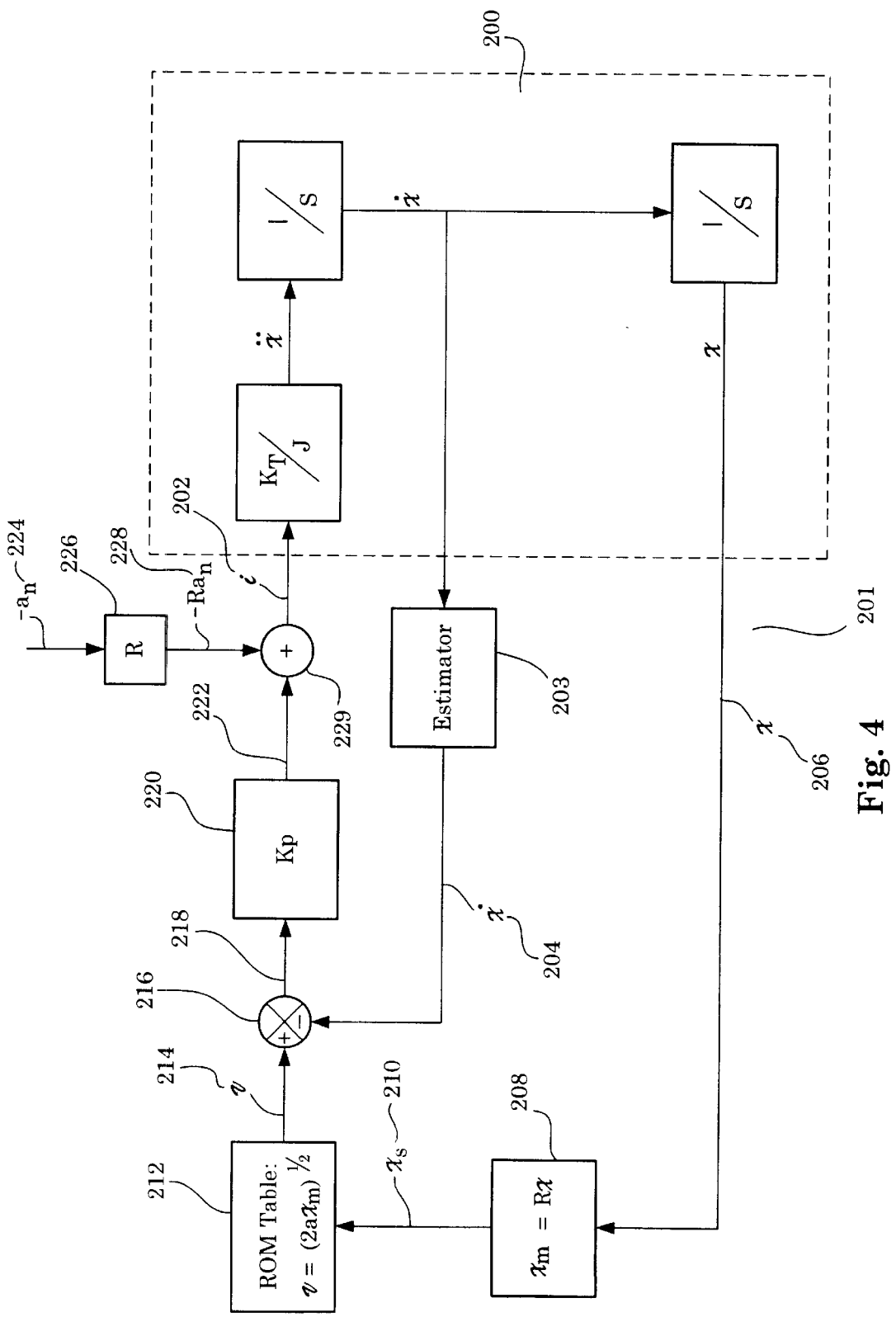
FIG. 4 is a signal flow diagram of a servo control system in accordance with the present invention.

FIG. 4 is a signal flow diagram of a control system 201 in accordance with the present invention. The servomechanism 200 in FIG. 4 is driven by a current 202, and returns a position signal 206 (actually provided by a transducer), from which a velocity signal 204 is estimated by an estimator 203. When the servomechanism 200 is unsaturated, the driving current 202 is proportional to the acceleration of the servomechanism 200. The velocity signal 204 represents the actual velocity of the servomechanism 200, and the position signal 206 represents the distance of the head from its desired track location.

At a scaling stage 208, the position signal 206 is multiplied by the performance ratio to produce a scaled position signal 210. At a lookup stage 212, the scaled position signal 210 is used to index into a velocity profile to obtain a target velocity 214. In concert, the scaling stage 208 and the lookup stage 212, permit the control system 201 to arrive at a target velocity 214 for a given head position and performance ratio, without necessitating either the execution of a square root operation or the storage of velocity profile for each performance ratio. By using the performance ratio to scale the distance axis of the velocity profile, the single stored velocity profile is converted into a customized profile for a given performance ratio.

At an addition stage 216, the actual velocity signal 204 is subtracted from the target velocity signal 214, producing an error signal 218. The error signal 218, is amplified at a second scaling stage 220, to produce an error product 222. The second scaling stage 220 ensures control system stability.

At a final scaling stage 226, a feedforward deceleration signal 224 is multiplied by the performance ratio to produce a scaled feedforward deceleration signal 228. At a final addition stage 229, the scaled deceleration signal 228 is added to the error product 222, to produce the aforementioned current 202 which drives the servomechanism 200. The use of the scaled feedforward deceleration signal to produce the current 202 ensures smaller error signals 218, with the concomitant effect of shorter settling times.

Figure 5:
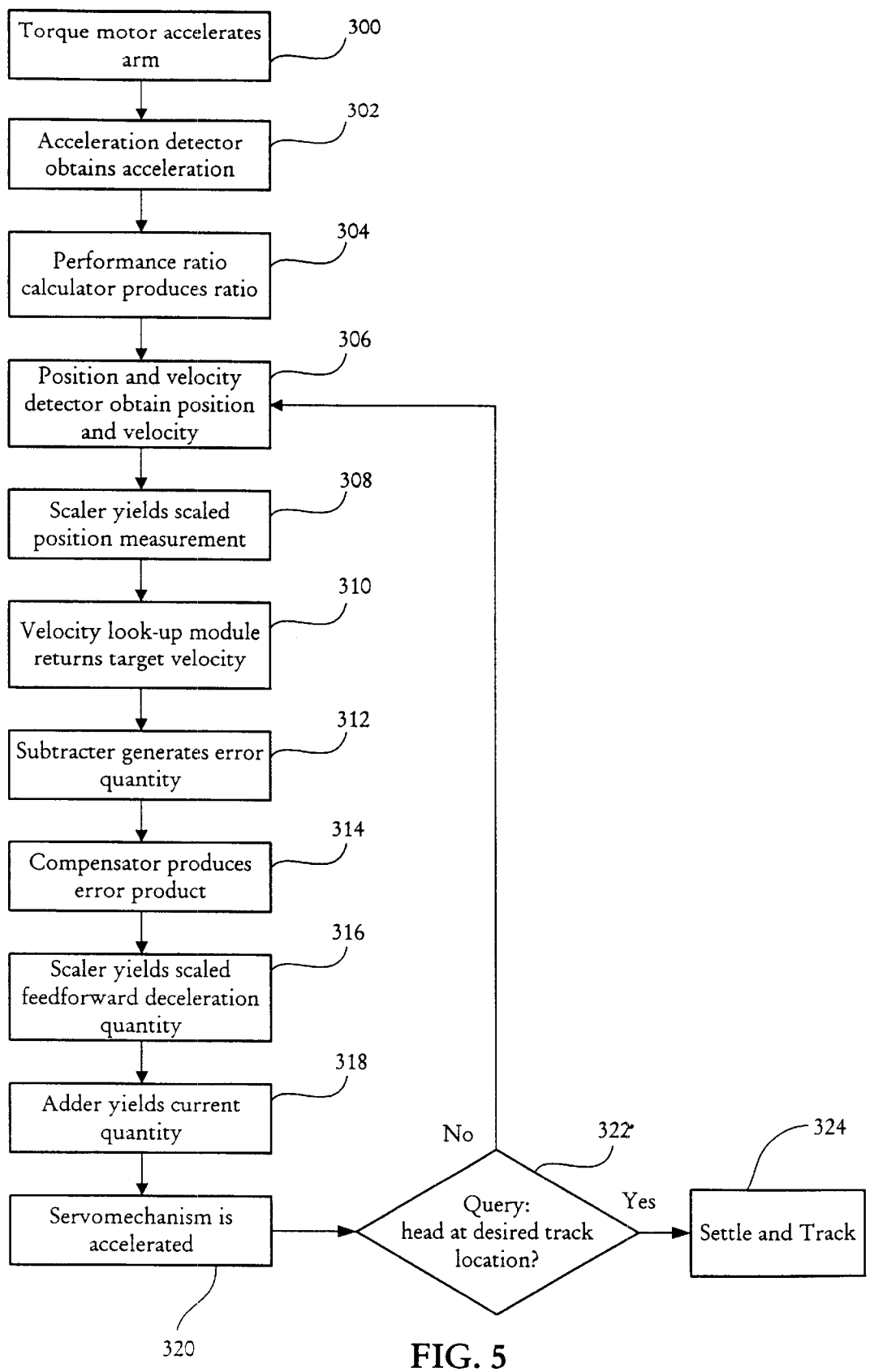
FIG. 5 is an operation flow diagram of an embodiment of the present invention operating in the disc drive system of FIG. 2, and more particularly the control system of FIG. 6.

One particular method of controlling the servomechanism in accordance with the present invention is shown in FIG. 5. Torque motor operation 300 accelerates the actuator arm with maximum torque. During this period of acceleration, the acceleration detection operation 302 obtains the actual acceleration of the actuator arm. The actual acceleration of the actuator arm may be obtained in a variety of manners. For instance, acceleration could be indicated by measuring displacement over a given period of time. Additionally, actual acceleration could be obtained by subtracting consecutive velocity measurements, and dividing the difference between these measurements by the interval of time between them. Alternatively, actual acceleration could be arrived at by dividing twice the distance that the head has traveled by the square of the time it took for the head to travel the distance ($a=2x/t^2$). The performance ratio calculator 304 produces a ratio therefrom, the ratio being defined as actual acceleration divided by nominal acceleration. Because acceleration may be obtained by measuring the distance the head travels over a given interval of time, the system is able to determine acceleration, and therefore the performance ratio, by measuring head displacement, a variable it can determine with precision. Further, acceleration may be measured prior to the head achieving maximum velocity, meaning this method requires a relatively small minimum seek length.

Control then transfers to position and velocity detection operation 306, in which both the actual velocity of the head and its distance from the desired track location are obtained. The velocity of the head may be obtained in a number of manners. For example, the velocity of the head may be estimated by use of an estimator which uses velocity and acceleration information to provide a velocity estimate. Additionally, the velocity of the head may be approximated by subtracting consecutive position measurements and dividing the difference by the corresponding time interval. In scale operation 308, the distance measurement is multiplied by the performance ratio, yielding a scaled distance measurement. The scaled distance measurement is then used to index into the velocity profile to obtain a target velocity in the target velocity look-up operation 310.

Subtracter operation 312 deducts the actual velocity of the head from the target velocity, generating an error quantity. Next, compensator operation 314 multiplies the error quantity by a constant, $K_p$, producing an error product, and ensuring the stability of the loop.

Control then transfers to scale operation 316 in which a feedforward deceleration quantity is multiplied by the performance ratio, yielding a scaled feedforward deceleration quantity. Next, in adder operation 318, the sum of the scaled deceleration quantity and the error product is claculated, yielding a current quantity. The servomechanism is then accelerated at a rate proportional to the current quantity in servo drive operation 320.

Next, query operation 322 detects whether the head has come to rest at the desired track location. If the head is not so positioned, control branch "NO" is navigated to velocity detection operation 306. Otherwise, control transfers to settle and track operation 324, a subsequent stage of head control.

Figure 6:
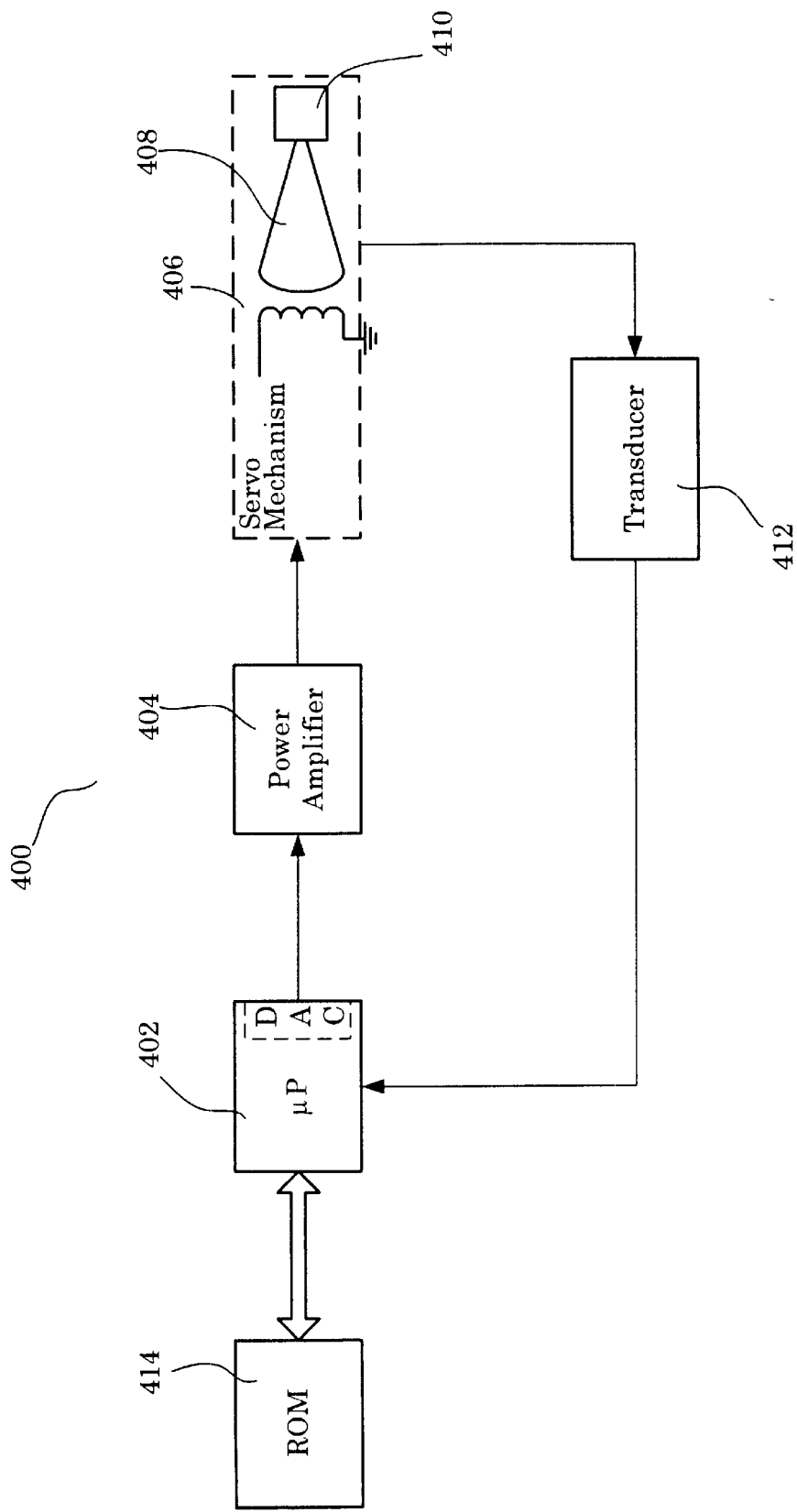
FIG. 6 illustrates a control system in accordance with the present invention.

FIG. 6 illustrates a block diagram of a control system in accordance with the present invention. Within the control system 400, a servomechanism 406 is used to apply torque to an actuator arm 408. A transducer 412 is coupled to the servomechanism 406 so that it produces a signal representative of the position of the head 410. A microprocessor 402 is operably connected to the transducer 412 and to a ROM 414 containing a velocity profile. The microprocessor 402 calculates the actual velocity of the actuator arm 408 from the position signal, and utilizes the position signal multiplied by a performance ratio to access the ROM 414 table for a target velocity. Then, the microprocessor 402 subtracts the actual velocity from the target velocity to produce an error quantity, multiplies the error quantity by a constant to produce an error product, and adds the error product to a ratio-scaled feedforward signal. The microprocessor 402 then converts the aforementioned sum into an analog signal, which a power amplifier 404 receives, and magnifies so as to drive the servomechanism 406.

To summarize the present invention, a method of governing the swing of an actuator arm, which fully utilizes the deceleration capacity of the servomechanism, can be realized by executing the following steps. First, the actuator arm is accelerated with maximum torque (such as in operation 300). Next, the actual acceleration of the actuator arm is obtained (such as in operation 302), and a ratio (the performance ratio) between the actual acceleration and a nominal acceleration is calculated (such as in operation 304). The actual acceleration of the actuator arm may be obtained in a variety of manners. For instance, acceleration may be indicated by measuring the displacement of the head over a given period of time. Additionally, actual acceleration could be obtained by subtracting consecutive velocity measurements, and dividing the difference between these measurements by the interval of time separating them. Alternatively, actual acceleration could be arrived at by dividing twice the distance that the head has traveled by the square of the time it took for the head to travel the distance ($a=2x/t^2$).

A control loop is then entered wherein the first step is to obtain the actual velocity and distance of the head from its desired track location (such as in operation 306). The velocity of the head may be obtained in a number of manners. For example, the velocity of the head may be arrived at by subtracting consecutive position measurements and dividing the difference by the corresponding time interval. Next, the distance measurement is multiplied by the performance ratio (such as in operation 308), and the newly scaled distance measurement is used to access a velocity profile which returns a target velocity (such as in operation 310). The velocity profile may be designed to return a target velocity that is equal to the square root of the product of twice the nominal acceleration and the distance the actuator arm is from its target location. Next, the measured velocity is subtracted from the target velocity (such as in operation 312), and the difference is multiplied by a constant for the sake of filter stability, yielding an error product (such as in operation 314). The error product is then added (such as in operation 318) to a feedforward deceleration quantity that has been multiplied by the performance ratio (such as in operation 316). Finally, the servomechanism is accelerated at a rate proportional to the aforementioned sum by driving the servomechanism with a current which is, iteslf, proportional to the aforementioned sum (such as in operation 320). This loop is traversed until the head comes to rest at its intended track location.

In a control system (such as 201), a servomechanism is used to apply torque to an actuator arm. The servomechanism may be a torque motor. A transducer is coupled to the servomechanism so that it produces a signal representative of the position of the head. A microprocessor is operably connected to the transducer and to a ROM possessing a velocity profile. The microprocessor calculates the actual velocity of the actuator arm from the position signal, and utilizes the position signal multiplied by a performance ratio to access the ROM table for a target velocity. Then, the microprocessor subtracts the actual velocity from the target velocity to produce an error quantity, multiplies the error quantity by a constant to produce an error product, and adds the error product to a ratio-scaled feedforward signal. The microprocessor then converts the aforementioned sum into an analog signal, which a power amplifier receives, and magnifies so as to drive the servomechanism.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for adapting a nominal velocity profile for an actuator arm in a disc drive to the actual deceleration capability of a servomechanism comprising steps of:

a) accelerating the actuator arm with maximum torque;

b) during each seek operation exceeding a predetermined length, obtaining actual acceleration of the actuator arm;

c) during each seek operation exceeding a predetermined length, calculating a ratio between the actual acceleration and a nominal acceleration of the actuator arm; and d) multiplying an actual distance parameter by the ratio before indexing into the velocity profile to retrieve a target velocity.

2. The method of claim 1 wherein step b) comprises:

(b)(i) subtracting consecutive velocity measurements over a given time interval; and (b)(ii) dividing the difference of step (b)(i) by the time interval.

3. The method of claim 1 wherein step b) comprises:

(b)(i) multiplying by two the distance that the head has traveled over a given time interval; and (b)(ii) dividing the product of step (b)(i) by the square of the time interval.

4. The method of claim 1 wherein step b) comprises:

(b)(i) measuring the displacement of the head over a given period of time.

5. The method of claim 1 wherein the method includes an additional step:

e) multiplying a feedforward control signal by the ratio before it is fed forward into a control loop.

6. A method of controlling swing, during a seek operation, of an actuator arm with a head mounted on the distal end of the actuator arm comprising steps of:

a) obtaining head position;

b) obtaining head velocity;

c) looking up a target velocity for the head, based upon the head position scaled by a performance ratio;

d) subtracting the head velocity from the target velocity to produce an error quantity;

e) multiplying the error quantity by a constant to produce an error product;

f) adding to the error product a feedforward quantity that has been scaled by the performance ratio; and g) producing a driver current proportional to the sum produced in step f).

7. The method of claim 6 wherein step b) comprises:

(b)(i) subtracting consecutive position measurements over a given time interval; and (b)(ii) dividing the difference of step h) by the time interval.

8. An adaptive control system for an actuator arm in a disc drive comprising:

a servomechanism that applies torques to the actuator arm;

a transducer operably connected to the servomechanism so that the transducer produces a signal representative of head position;

a memory device possessing a velocity profile table;

a microprocessor operably connected to the transducer and the memory device, programmed to i) estimate head velocity from the head position signal;

ii) use the head position multiplied by a performance ratio to access the table stored in the memory device for a target velocity;

iii) subtract head velocity from the target velocity to produce an error quantity;

iv) to multiply the error quantity by a constant to produce an error product;

v) to add the error product to a feedforward signal multiplied by the performance ratio; and vi) convert the sum of step v) into an analog signal;

a power amplifier operably connected to the microprocessor and the servomechanism, that receives the analog signal and magnifies the analog signal to drive the servomechanism.

9. The control system of claim 8 wherein the servomechanism comprises a voice coil motor accelerating the actuator arm.

10. The control system of claim 8 wherein the velocity profile is such that target velocity equals twice a nominal acceleration multiplied by distance of the head from the head's target location, the product being raised to a power of one-half.

11. The apparatus of claim 8 wherein the microprocessor is further programmed to, during each seek operation exceeding a predetermined length, calculate a performance ratio based upon actual acceleration of the actuator arm and nominal acceleration thereof.

12. A control system for an actuator arm in a disc drive that can adapt a nominal velocity profile based upon the actual deceleration capability of a servomechanism, comprising:

a servomechanism that can apply torque to the actuator arm; and means for determining a performance ratio during each seek operation exceeding a predetermined length and utilizing the performance ratio to scale a velocity profile and a feedforward control signal that, together, cooperate to control the torque to the actuator arm.

* * * * *